(12) United States Patent
Ferencz

(10) Patent No.: US 7,468,401 B2
(45) Date of Patent: Dec. 23, 2008

(54) BONDING OF POWDER COATING COMPOSITIONS

(75) Inventor: Joseph M. Ferencz, Litchfield, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 607 days.

(21) Appl. No.: 11/060,824

(22) Filed: Feb. 18, 2005

(65) Prior Publication Data

US 2006/0189718 A1 Aug. 24, 2006

(51) Int. Cl.
*C09D 5/29* (2006.01)
(52) U.S. Cl. ...................................... 523/171
(58) Field of Classification Search ................ 523/172
See application file for complete search history.

(56) References Cited

U.S. PATENT DOCUMENTS

| | | | |
|---|---|---|---|
| 3,932,320 A | 1/1976 | Camelon et al. | |
| 4,138,511 A | 2/1979 | Rolles et al. | |
| 4,801,680 A | 1/1989 | Geary et al. | |
| 5,045,114 A | 9/1991 | Bigalk et al. | |
| 5,187,220 A | 2/1993 | Richart et al. | |
| 6,162,856 A * | 12/2000 | Crompton et al. | 524/441 |
| 6,166,123 A | 12/2000 | Blatter et al. | |
| 6,541,540 B2 | 4/2003 | Hashizume | |
| 2004/0018109 A1 | 1/2004 | Blatter et al. | 419/32 |

\* cited by examiner

*Primary Examiner*—Edward J Cain
(74) *Attorney, Agent, or Firm*—Robert A. Diaz

(57) ABSTRACT

A method of producing a coating composition containing flake-like, color effect pigment particles and polymeric binder. The pigment composition has an initial size with fine particles. Upon mixing and heating the pigment composition to a temperature to achieve a second particle size distribution, the fine particles in the initial particle size distribution are bound to the larger particles in the pigment composition. The time and temperature of bonding the pigment composition can be adjusted to account for the chemistry of the polymeric binder and the loading of the flake-like, color effect pigment.

20 Claims, 10 Drawing Sheets

BONDING OF POWDER COATING COMPOSITIONS

FIELD OF THE INVENTION

The present invention is directed to methods of producing powder coating compositions that contain flake-like, color effect pigments and to coating compositions prepared thereby.

BACKGROUND OF THE INVENTION

Solvent-based coating compositions used in automotive finishes or industrial paints typically include a polymeric resin base in which are dispersed flake-like pigments, such as metal flakes, that create a color effect in the coating composition such as metallic luster or goniochromism. The metal flakes tend to align parallel to the surface of the coated substrate, thereby presenting a flat, reflective surface which gives a desired appearance to the coating when the paint dries or is baked.

Tough abrasion resistant coatings can be produced by powder coating methods. However, alignment of flake-like pigments in powder coating compositions to achieve the color effects similar to those achievable in solvent-based coating compositions is problematic. Powder coating compositions are commonly applied through electrostatic spray coating. In the electrostatic spray process, components of the coating composition (including a polymeric resin and additives) are ground to produce powder particles which are dispersed in an air stream. The dispersed particles are subjected to a high voltage field in which the particles pick up an electrostatic charge. The charged particles are attracted to a charged substrate resulting in a fine layer of powder on the substrate. The coated substrate is heated to a temperature sufficient to melt the powder coating and to cause it to flow and provide a smooth, even finish.

Metal flakes can be included in a coating powder by admixing the metal flakes with the resin, as well as flow-control agents, curing agents, pigments, fillers, etc., prior to melt-compounding of the ingredients. However, during grinding of the composition to produce a coating powder, the flakes are often significantly fragmented, and the finish that results from such a coating powder has a dull, grey appearance.

Attempts to enhance the appearance of metallic finish have focused on methods of admixing the flake-like pigment with the polymeric coating powder particulates. However, in the powder coating process, such an admixture often results in inconsistent coatings. In the electrostatic coating process, the coating powder is sprayed through a gun where a high voltage corona discharge is used to establish an ionized field. As the powder particles pass through the ionized field, they become charged and are attracted to the substrate, which is usually a metallic article to be coated. Powder that is not deposited on the substrate is collected in a reclamation system and returned for admixture with the virgin material for reapplication. When metal flakes are merely admixed with the polymeric coating particulates, the flakes are not charged to the same extent or deposited at the same rate as the polymeric coating powder particulates. Over a period of time during which overspray is continuously reclaimed and admixed with virgin material, the metallic flake pigment becomes more concentrated in the powder being sprayed, changing the appearance of the resulting finish from the finish which resulted from spray at the start of the run. Eventually, the increasing concentration of metal flakes may interfere with the charging mechanism. If the powder in the ionized field becomes too conductive, the electrostatic gun may "short out" or result in an explosion.

One solution to this problem of producing powder coating compositions that contain flake-like pigments has been to fuse or bond the flake-like pigments to particles of the base resin of the coating composition. By adhering the flake-like pigments to the resin particulates, the composition does not change significantly over time in a process in which overspray coating powder is reclaimed and reintroduced. Accordingly, the resulting finishes are more uniform over time.

Bonding of flake-like pigments to resin particles can be achieved by high shear mixing. However, many flake-like pigments are sensitive to fragmentation in high shear environments whereby the flake shape is damaged or destroyed, such that the resulting powder coating compositions yield low quality finishes.

An alternative method of bonding that has achieved some commercial success involves controlled heating of the flake-like pigment and resin mixture with low or medium shear mixing. According to this method, the powder composition is heated just enough to slightly soften the resin particles so that the flake-like pigment particles will adhere thereto. While elevated temperatures have been demonstrated to enhance bonding of flake-like pigments to resin particles, this conventional practice dictates that the bonding temperature be no more than 2° F. higher than the $T_G$ of the base resin. By controlling the bonding temperature to a maximum of 2° F. higher than the $T_G$ of the base resin, it has been thought that the resin begins to soften yet remains particulate (not melted) so that bonding can occur with the particles of the flake-like pigment without losing the particulate form of the resin.

While this blanket approach to bonding based solely on the $T_G$ of the base resin can be used with some success, it does not account for significant differences in the total composition of the powder coating, i.e., the resin, flake-like pigment, fillers, etc. The potential heat intake of a composition is determined not only by the base resin but also by all the components thereof. As such, the control of bonding processes based solely on the $T_G$ of base resin is not necessarily appropriate for all powder coating compositions.

Accordingly, a need remains for a method of producing coating powders which result in a lustrous metallic finish that is consistent over time when using various base resins, flake-like pigments and fillers in a process in which overspray particles are reclaimed and returned.

SUMMARY OF THE INVENTION

This need is met by the method of the present invention of producing a powder coating composition that contains flake-like, color effect pigment particles and a polymeric binder. The pigment composition has an initial particle size distribution containing fine particles. The pigment composition is mixed and heated to a temperature to achieve a second particle size distribution substantially without the fine particles. The pigment composition is cooled to produce the powder coating composition. In the heating step, the temperature of the pigment composition is raised to more than 2° F. greater than the $T_G$ of the polymeric binder. This increased temperature may be 1 to 15% greater than the $T_G$ of the polymeric binder. In one embodiment, in the initial particle size distribution, the fine particles are sized up to 5 microns with the fine particles being present in the pigment composition in an amount of 2 to 20% or 4 to 8 volume % based on the total volume of the pigment composition.

In another embodiment, when the particle size distribution is determined as a function of particle count, the initial particle size distribution has a single mode. Upon completion of the heating and mixing step, the particle size distribution shifts to the second particle size distribution which has two modes. The mode of the initial particle size distribution is located between 5 and 20 microns, and the two modes of the second particle size distribution are located between 10 and 50 microns. The pigment composition may contain flake-like, color effect pigment particles and other pigment particles that are non-leafing in shape. The non-leafing pigment particles may be organic coloring pigments or inorganic filler pigments and may comprise from 10 to 40 volume % based on the total volume of the pigment composition.

The flake-like, color effect pigments may be leafing or non-leafing pigments, including metal flakes such as aluminum or metal oxide coated mica. The polymeric binder may be a thermosetting composition such as an epoxy group containing material and a curing agent. The present invention also includes a powder coating composition produced according to these methods as well as substrates coated using the methods of the present invention. The present invention is particularly suited for coating metallic substrates such as automotive components.

DETAILED DESCRIPTION OF THE INVENTION

Figure 1:
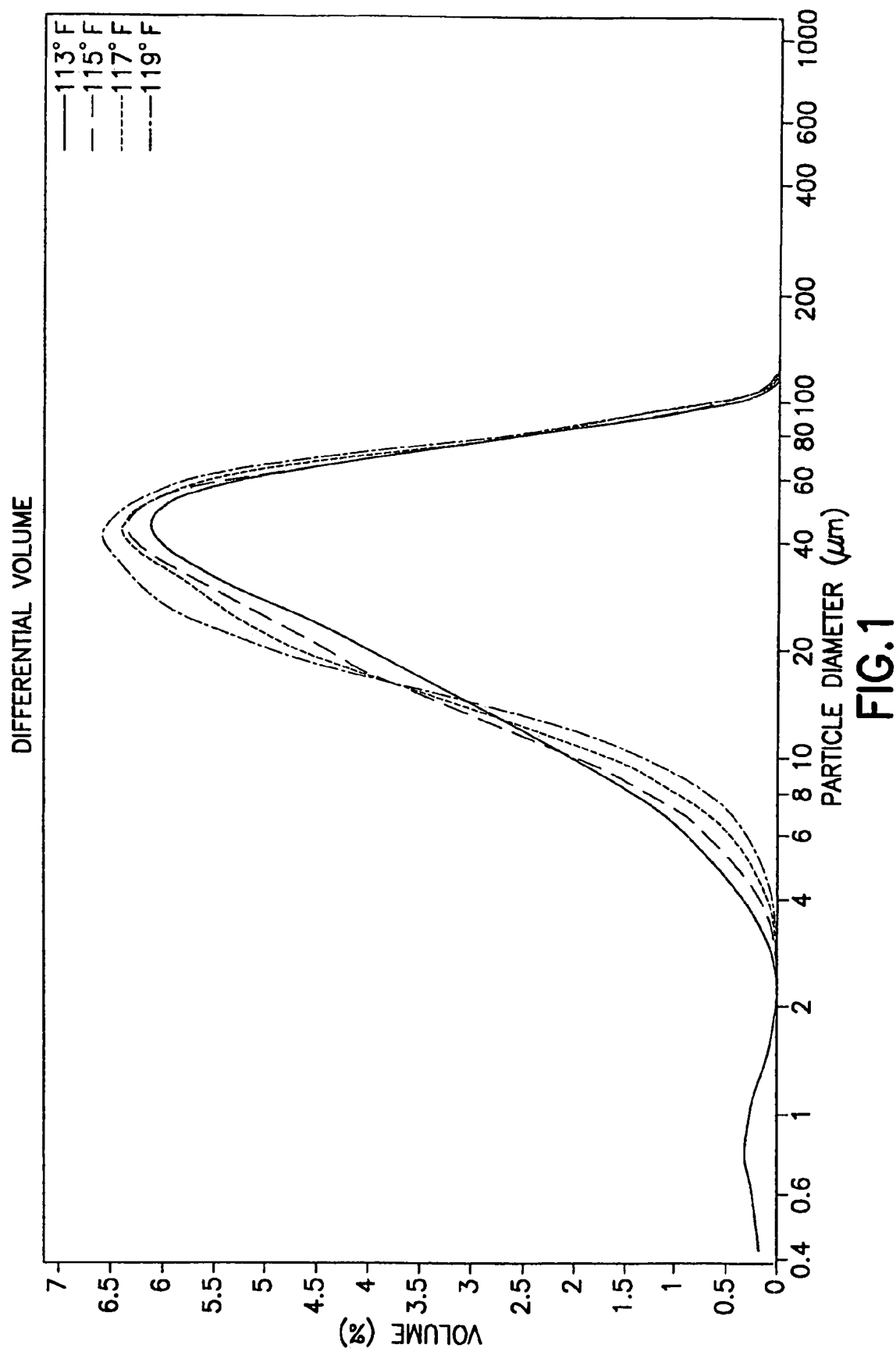
FIG. 1 is a graph of the volumetric particle size distribution of the epoxy polymeric binder of Example 1 treated at increasing temperatures.

The present invention is directed to a method for improving the uniformity in the appearance and metallic effect of flake-like, color effect pigments in resinous powder coatings that have traditionally been the result of improper orientation of the flake-like pigments in a film of the powder coating and non-uniform distribution of the non-leafing pigments and other pigments throughout the coating. In particular, the flake-like, color effect pigments which are typically metal and the resinous particles have differences in both their density and electrical conductivity. These differences in density and electrical conductivity contribute to the non-uniform distribution of the respective particles in conventional powder coatings. Not only does particle segregation create a non-uniform appearance in the powder coating applied to a substrate, the presence of individual discreet particles of the flake-like pigments (generally metallic) provides an opportunity for the powder composition to produce electrical discharges (i.e., sparking) during the electrostatic spraying of the powder onto a substrate to be coated. While prior attempts to bond flake-like pigments to polymeric binder to improve the uniformity of the resulting coating have helped and maintained the integrity of the flake-like pigments and the uniformity of appearance, these processes do not necessarily control the particle size distribution of the components of the powder coating composition of both the metallic particles and the resinous particles. The present invention is directed to a method of producing a powder coating composition in which the particle size distribution, in particular the presence of fine particles sized 5 microns or less, is controlled.

The powder coating compositions produced according to the method of the present invention are produced from a pigment composition that contains flake-like, color effect pigment particles and a polymeric binder. The pigment composition may further include other non-leafing pigments such as organic coloring pigments and/or inorganic filler pigments. Other conventional additives may be included in the powder coating composition such as fluidizing agents, lubricants and the like. The polymeric binder may be a thermosetting resin which is used in conjunction with a crosslinking agent and/or a curing catalyst. Suitable resins for use as the polymeric binder in the present invention include, but are not limited to, epoxy resins, polyester resins, polyurethane resins, epoxy/polyester hybrid resins and acrylic resins. The resin is selected to have a softening temperature that is sufficiently high to prevent the particulates of the resin from sintering or fusing during transportation and storage, but that is sufficiently low that the resin particles can be melt compounded at a temperature below the temperature at which the reaction between the resin and the crosslinking agent and/or cure catalyst results in substantial curing of the resin. Generally, the softening temperature and melting point is a function of the monomers and the molecular weight of the resins.

The crosslinking agent and/or cure catalyst is selected as appropriate for the resin used and to provide substantial curing only at a temperature above the melting point of the resin. Epoxy resins may be cured by dicyanamides or anhydrides. Hydroxyl functional polyester resins may be cured with multi-functional isocyanates to form urethane polyesters. Acid functional polyester resins can be cured with isocyanurates. Epoxy-polyester hybrids may be cured by reaction with each other, and hydroxyl functional acrylic resins may be cured with multi-functional isocyanates. The amount of crosslinking agent and/or curative that is sufficient to effect the curing depends on the particular chemistry and stoichiometry of the resin used, and may be 5 to 20 weight % of the resin.

The flake-like, color effect pigments used in the present invention typically are metal flakes such as aluminum flakes or metal oxide coated mica flakes or both. As used herein, a flake has a ratio of its width to its thickness (termed aspect ratio) that is at least 2 and typically falls in the range of 10 to 2,000. As such, the flakes are substantially flat structures. Aluminum flakes are common flake-like, color effect pigments. Other metals that may be used include nickel, bronze, zinc and stainless steel. The amount by weight of flake-like, color effect pigments relative to the amount by weight of the polymeric binder may vary over a wide range depending on a variety of factors including the relative densities of the flake-like, color effect pigments and the particulates of the polymeric binder, the desired finish, whether the flake-like, color effect pigment should provide a uniform appearing surface, such as a mirror-like surface, or whether flake-like, color effect pigments are provided for accent such as a sparkle and the thickness of the flake-like, color effect pigments. In one embodiment of the invention, the flake-like, color effect pigments are included at 0.5 to 20 weight % relative to the weight of the polymeric binder and may be included in amounts of 1 to 5 weight %.

The pigment composition used in the present invention has an initial particle size distribution where there are particles which are typically sized 0.5 to 100 microns. The present invention includes a method of producing a powder coating composition in which the pigment composition containing the flake-like, color effect pigment particles in polymeric binder are mixed and heated to change the initial particle size distribution of the pigment composition to a second particle size distribution that is substantially without fine particles, fine particles defined herein as sized up to 5 microns. Both the polymeric binder and the flake-like, color effect pigments have fine particles in the initial size distribution. In one embodiment, the fine particles are present in the pigment composition in an amount of 2 to 20 volume % based on the total volume of pigment composition and may be present in the initial particle size distribution of the pigment composition in an amount of 4 to 8 volume % of the total volume of the pigment composition.

Upon heating the pigment composition to a temperature which is more than 2° F. greater than the $T_G$ of the polymeric binder, the initial particle size distribution exhibiting fine particles that are sized up to 5 microns changes to a second particle size distribution that is substantially without fine particles.

In one embodiment of the invention, when the initial particle size distribution of the pigment composition is compared to the second particle size distribution, the initial particle size distribution has a single mode; whereas the second particle size distribution has two modes which are centered at higher particle sizes than the single mode of the initial particle size distribution. According to this populative analysis of the number of particles present in the pigment composition in the initial particle size distribution and in the second particle size distribution, it is believed that the fine particles sized up to 5 microns become attached to larger particles such as particles sized 8 to 20 microns, thereby reducing the particle count at the lower end of the particle size distribution and creating a new mode (the second mode) for the fine particles which become attached to the 8 to 20 micron size particles. In one embodiment of the invention, the mode of the initial particle size distribution is located between 5 and 20 microns. After heating and mixing the pigment composition, the second particle size distribution in the pigment composition has two modes that are located between 10 and 50 microns. In this manner, bonding of the flake-like, color effect particles to the polymeric binder is evidenced by a change in the particle size distribution determined as a function of particle count. In one embodiment of the invention, bonding is considered to be achieved upon evidence of a second size distribution that is particle size bimodal. In another embodiment, the second particle size distribution is not necessarily bimodal, yet it is distinct from the first particle size distribution. In that case, bonding is determined to be achieved upon evidence of the second particle size distribution.

In addition to the flake-like, color effect pigment and the polymeric binder in the pigment composition, the pigment composition may also include other non-leafing pigment particles. Suitable non-leafing pigment particles include organic coloring pigments and inorganic filler pigments, as well as other fillers such as flow control additives and the like. The non-leafing pigments and other materials may constitute from 10 to 20 volume % of the powder coating composition based on a total volume of the pigment composition.

A result of producing a powder coating composition according to the present invention is a powder coating composition that includes non-leafing pigment particles, flake-like, color effect pigment particles and a polymeric binder. The resulting powder coating composition has a particle size distribution determined as a function of particle count that is distinct from an initial particle size distribution that exhibited fine particles sized up to 5 microns and may have two count modes located between 10 and 50 microns. The present invention is particularly suited for coating metallic substrates such as automotive components or other metallic industrial components such as appliance components.

The method of the present invention and coating compositions prepared according to the present invention are illustrated in the examples that follow. The following examples are merely illustrative of the invention and are not intended to be limiting. Unless otherwise indicated, all parts are by weight. As used herein, unless otherwise expressly specified, all numbers such as those expressing values, ranges, amounts and percentages may be read as if prefaced by the word "about". Any numerical range recited herein is intended to include all sub-ranges, subsumed therein. Plural encompasses singular and vice versa. As used herein, the term "polymer" is meant to refer to prepolymers or oligomers and both homopolymers and copolymers. The prefix "poly" refers to two or more.

In order to practice the method of the present invention, it is helpful to first determine the onset $T_G$ (glass transition temperature) of the polymeric binder and determine the temperature at which fine particles sized up to 5 microns of the polymeric binder are removed by increasing the temperature of the polymeric binder. By onset $T_G$ it is meant the temperature of the polymeric binder at which the polymer exhibits segmental mobility of polymer segments within the polymer molecule. The temperature below which the polymer segments do not have sufficient energy to move past one another is the $T_G$. Differential scanning colorimetry (DSC) determines heat input as a function of temperature. The onset $T_G$ is an inflection point in the heat flow versus temperature graph. Upon determining a suitable increased temperature that is more than 2° F. above the $T_G$ of the polymeric binder, bonding is then tested by incorporating a mixture of the polymeric binder with the flake-like, color effect pigments to determine the length of time required to heat the pigment composition containing the polymeric binder and the flake-like, color effect pigments which will remove the fine particles from the pigment composition. Upon determining the suitable operating temperature (more than 2° F. above $T_G$) and length of time for the particular pigment composition, subsequent coating compositions can be prepared by reliably using these predetermined temperature and time parameters. The following examples set forth such processes.

EXAMPLE 1

A polymeric binder containing the reaction product of a carboxylic acid group-containing polyester and a hydroxyalkylamide was determined by DSC to have an onset $T_G$ of 109° F. According to conventional practice, bonding of this polymer having an onset $T_G$ of 109° F. would be performed at 111° F. and the flake-like pigment would be mixed with the polymer at this temperature for an empirically determined length of time. However, in the present invention, the particle size distribution of the base material is determined at the onset $T_G$ and temperatures greater than onset $T_G$ such as up to 15% higher than the onset $T_G$ of the polymeric binder.

Figure 2:
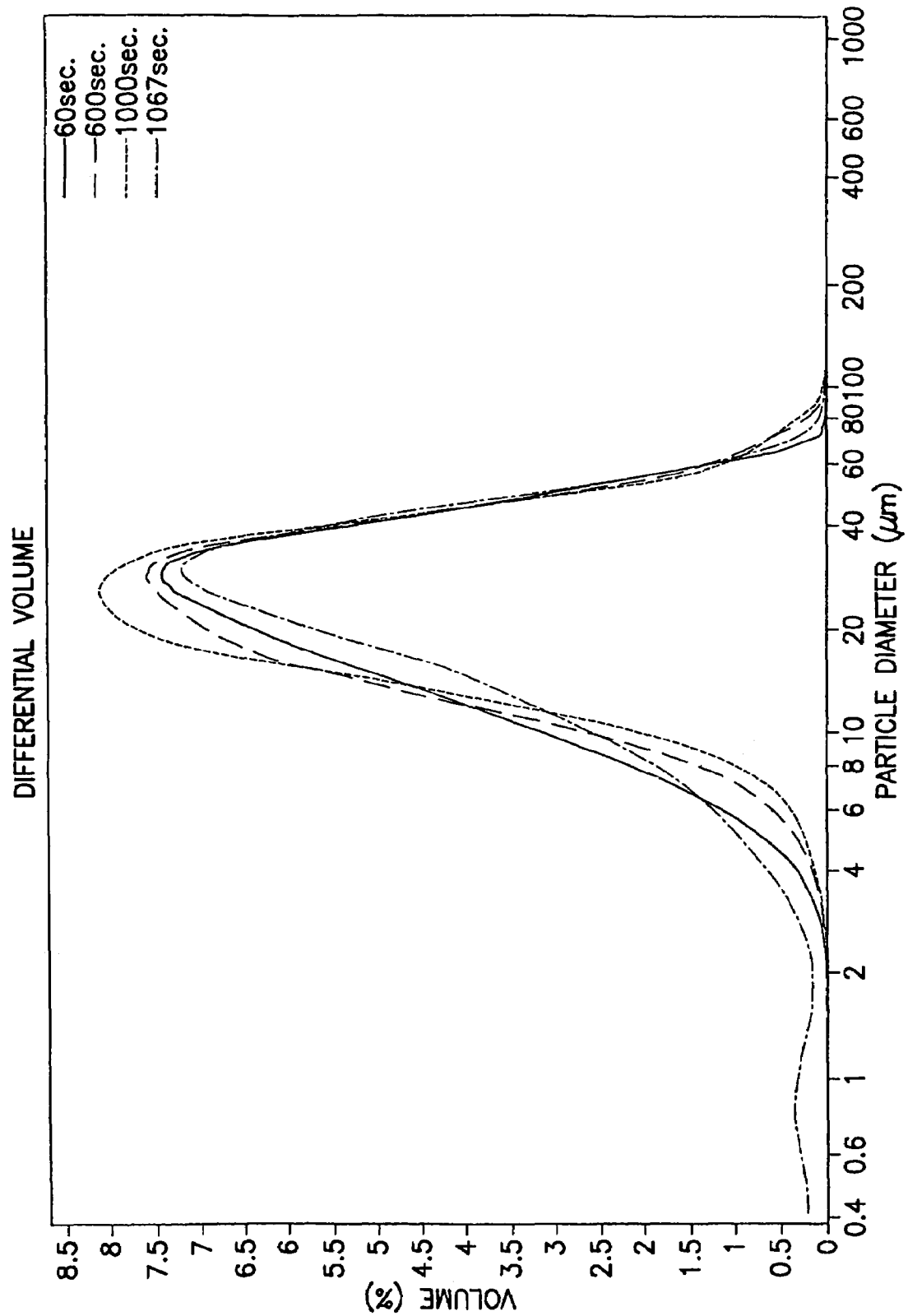
FIG. 2 is a graph of the volumetric particle size distribution of the binder of Example 1 treated for varying time periods.

In the following trials, the polymeric binder was heated in a Plasmec mechanical mixer to a temperature above onset $T_G$ for two minutes and the particle size was determined. As shown in FIG. 1, the particle size distribution at onset $T_G$ (109° F.) and at 2° F. higher than onset $T_G$ (111° F.) was the same as at 113° F. However, as the temperature was further increased, the particle size distribution began to shift to the right in favor of larger particles. FIG. 1 shows curves for the binder material at temperatures 113° F., 115° F., 117° F. and 119° F. As the temperature increased, the particle size distribution changed. The fine particles (sized 5 microns and less) disappeared and the peak mode of the particle size distribution narrowed. The particle size distribution was again tested using a midpoint temperature, in this case 115° F., and increasing the time that the polymeric binder was exposed to the elevated temperature. FIG. 2 shows the particle size distribution for polymeric binder elevated to 115° F. at 60 seconds, 600 seconds and 1000 seconds. The particle size distribution of the polymeric binder prior to heating is shown as a control. For the tested samples, the fine particles (5 microns or smaller) are progressively reduced with increasing heating time and the peak particle size increases with a narrowing of the particle size distribution in the peak. While increasing time at temperature can advantageously narrow and shift upwards the peak particle size distribution, some polymer systems are sensitive to premature melting and/or flake-like, color effect pigments combined with the polymeric binder cannot withstand long mix times.

EXAMPLE 2

Figure 3:
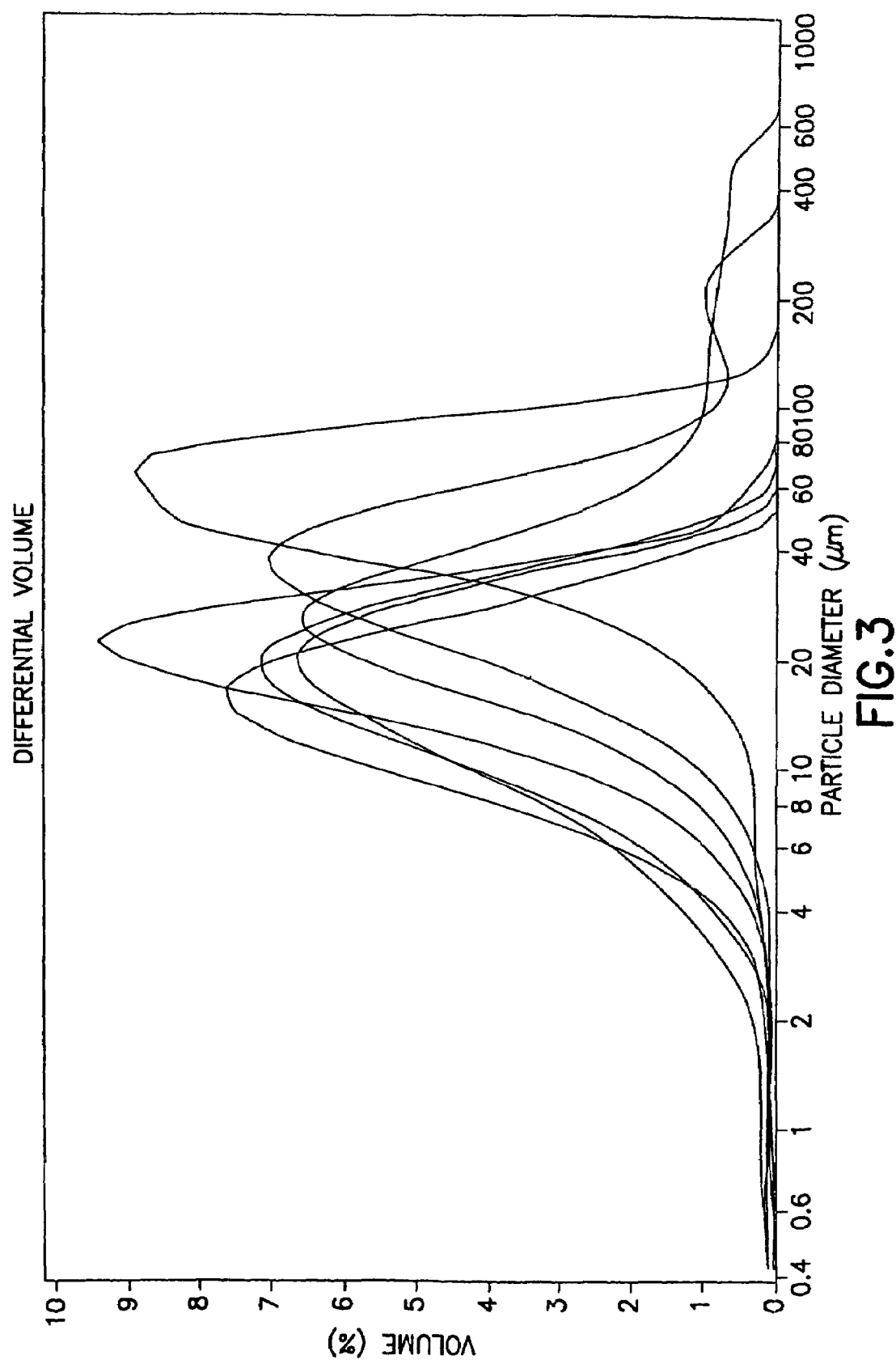
FIG. 3 is a graph of volumetric size distribution for the various flake-like, color effect pigments of Example 2.

The initial particle size distribution of the flake-like, color effect pigments can be an important factor in producing a powder coating composition according to the present invention. Flake-like, color effect pigments are commercially available in various sizes from a very low median of 12 microns to a very high median size of 80 microns. FIG. 3 is a particle size distribution of various flake-like, color effect pigments. Typically, thicker flake-like pigments are more resilient to processing, and finer particle size flake-like pigments are more resilient to processing as well. The ability of the flake-like, color effect pigment to withstand the bonding process in a mixing and heating device is critical to maximizing the bonding process. If the flake-like, color effect pigment is prone to tearing, a shorter and more elevated temperature bonding cycle should be performed in order to allow for sufficient fines removal of the base resin and the flake-like, color effect pigment by attaching those fine particles to larger ones or creating larger ones. On the other hand, if the flake-like, color effect pigment is relatively resilient to the mixing conditions in a bonder, longer bonding cycles can be performed at cooler temperatures to achieve the desired results. The following examples utilize Tufflake aluminum flake-like, color effect pigments from Silberline Manufacturing Co., Inc. (Tamaqua, Pa.) having a median particle distribution of about 19 (as shown in FIG. 3) and a high resistance to processing.

EXAMPLE 3

Figure 4:
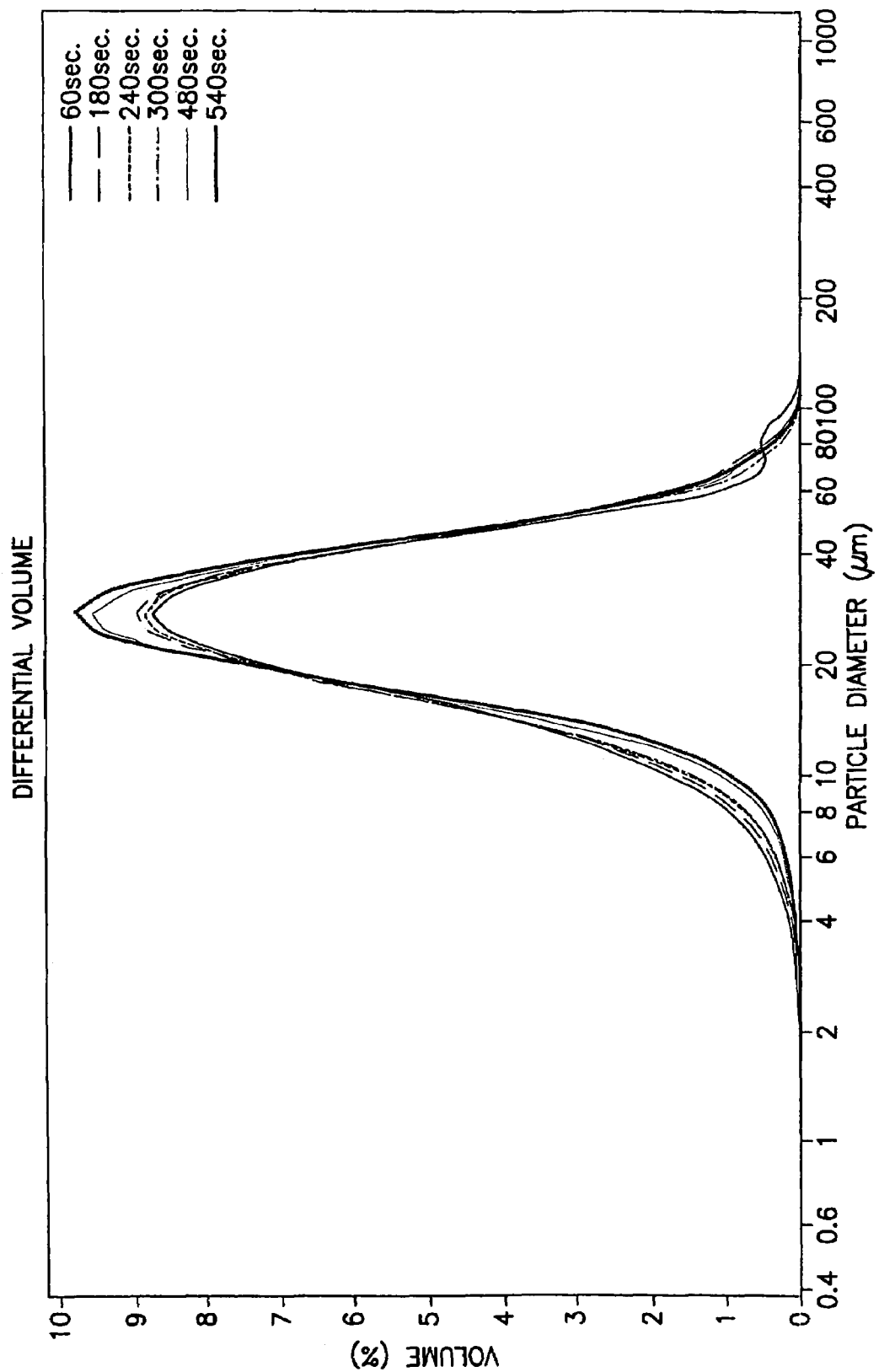
FIG. 4 is a graph of volumetric size distribution for the polymeric binder of Example 1 and a pigment of Example 2 treated for varying time periods.

The polymeric binder of Example 1 was mixed with the aluminum flake-like, color effect pigment of Example 2 in an amount of 8 weight % aluminum based on the total composition of polymer and aluminum. While the data of FIG. 1 indicates that the polymer can be heated to 119° F., upon incorporation of the aluminum pigment to the polymer mixture, the upper temperature limit for the resulting pigment composition is even higher, as much as 5 to 7° F. higher depending on the concentration of flake-like, color effect pigment in the pigment composition. In this case, a bonding temperature of 123° F. was found to be suitable. As shown in FIG. 4, at 60 seconds, marginal bonding has occurred as shown by the reduction in many of the fine particles and an excellent bonding has occurred at 480 seconds or longer as indicated by the narrowing of the particle size distribution peaks. This example demonstrates that the bonding temperature for a pigment composition containing flake-like, color effect pigments is significantly higher than 2° F. above onset $T_G$.

Figure 5:
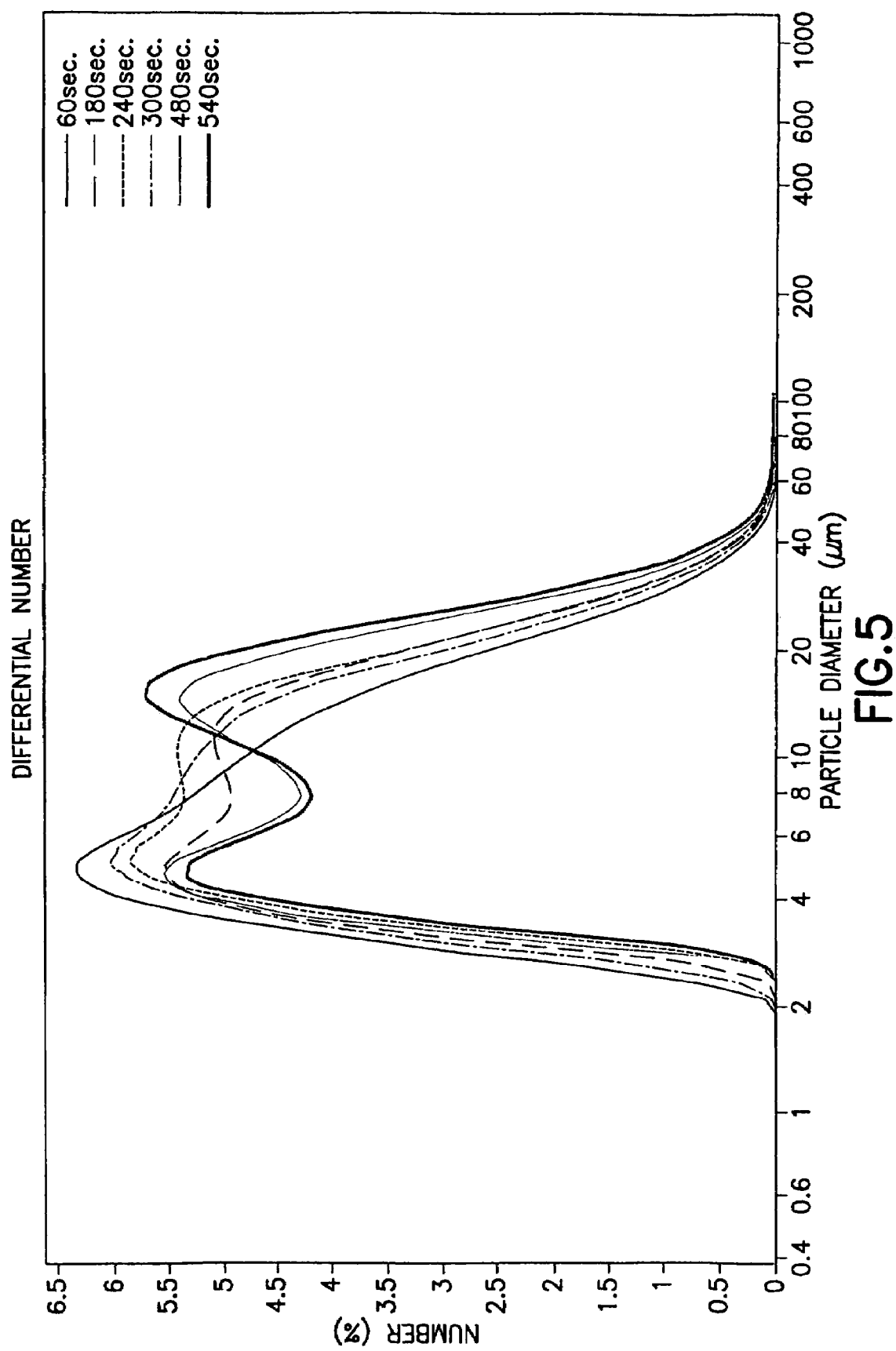
FIG. 5 is a populative particle size distribution of the composition of Example 3.

While FIG. 4 shows the volumetric shift in the particle size distribution upon bonding, FIG. 5 represents a populative analysis of particle size distribution. FIG. 5 shows the number of particles at each particle size following bonding at 120° F. for 60, 180, 240, 300, 480 and 540 seconds. The volumetric data presented in FIG. 4 is skewed by the high population of fines in the bonded compositions. While there is a high population of fines in these compositions, their volume as a percentage of the total is relatively small and changes in the volume percent are discernable, but still slight. In contrast, analysis of the number of particles having a certain particle diameter, as shown in FIG. 5, more clearly indicates the shift in particle size achieved during the bonding process of the present invention. The particle count for the pigment compositions treated for various lengths of time exhibits a shift in the particle size distribution from a single mode composition to a two mode composition as the time of bonding increases. This shift in particle size distribution measured as a valid basis of particle count from a single mode to a two mode is indicative that the bonding process has been successful and that the amount of fine particles are bonded to the polymeric binder and, as such, are effectively removed from the overall composition.

EXAMPLE 4

Figure 6:
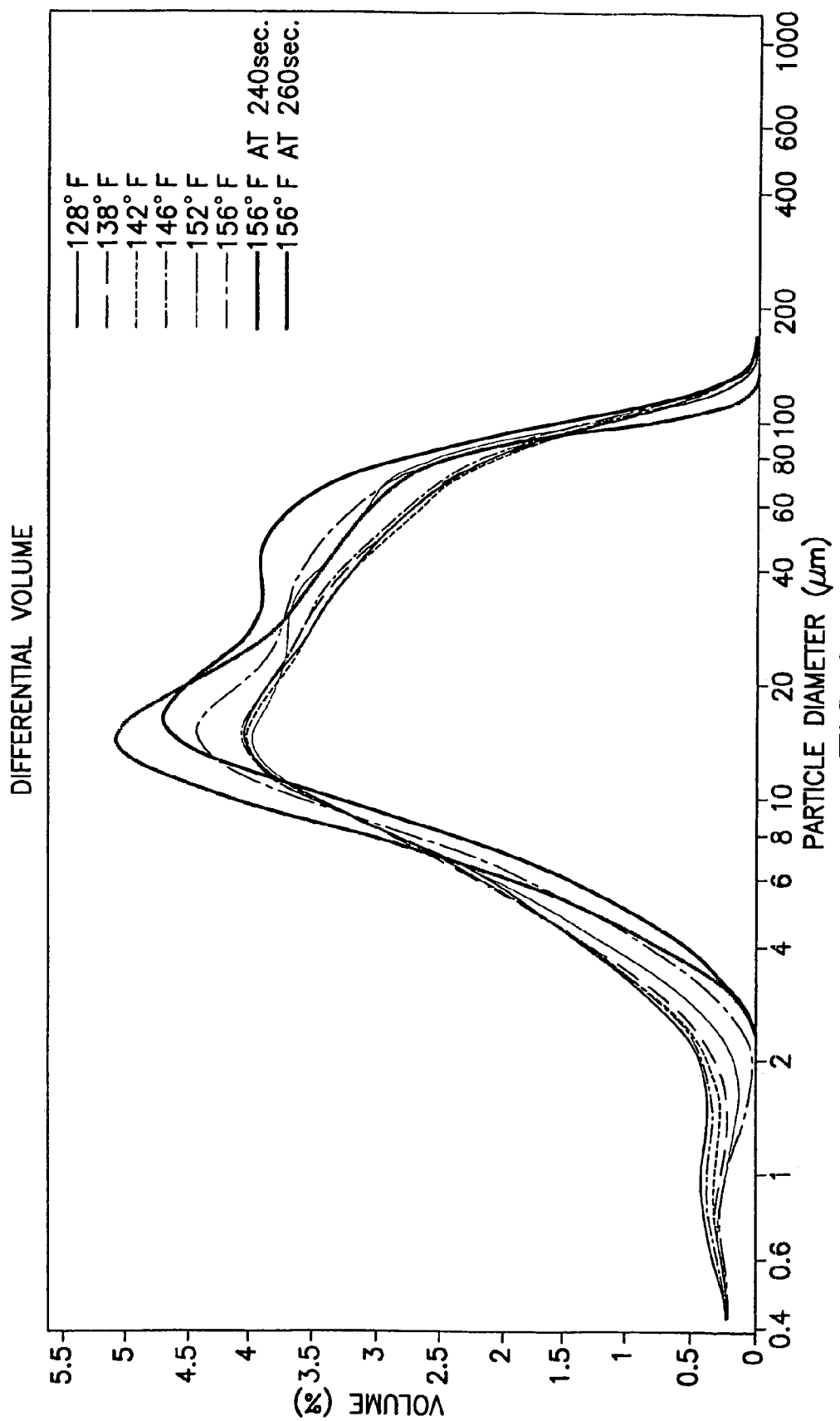
FIG. 6 is a volumetric particle size distribution of the acrylic urethane polymeric binder of Example 4 treated at increasing temperatures.

Examples 1 and 2 were repeated using an acrylic-urethane polymeric binder having onset $T_G$ of 118° F. as determined by DSC. The flake-like, color effect aluminum pigment was added to the polymer composition at 3.5 weight % based on the total pigment composition. FIG. 6 represents the volumetric study of the particle size distribution of the polymeric binder only. As temperature increased, the bimodal nature of the polymeric binder and reduction in fines is evidenced. This data indicates that bonding of fines occurred at a temperature approximately 25% higher than onset $T_G$. The inclusion of over 16% fines below 5 microns contributes to the high temperature required to achieve bonding of the fines. Complete bonding is believed to have occurred at 156° F.

Figure 7:
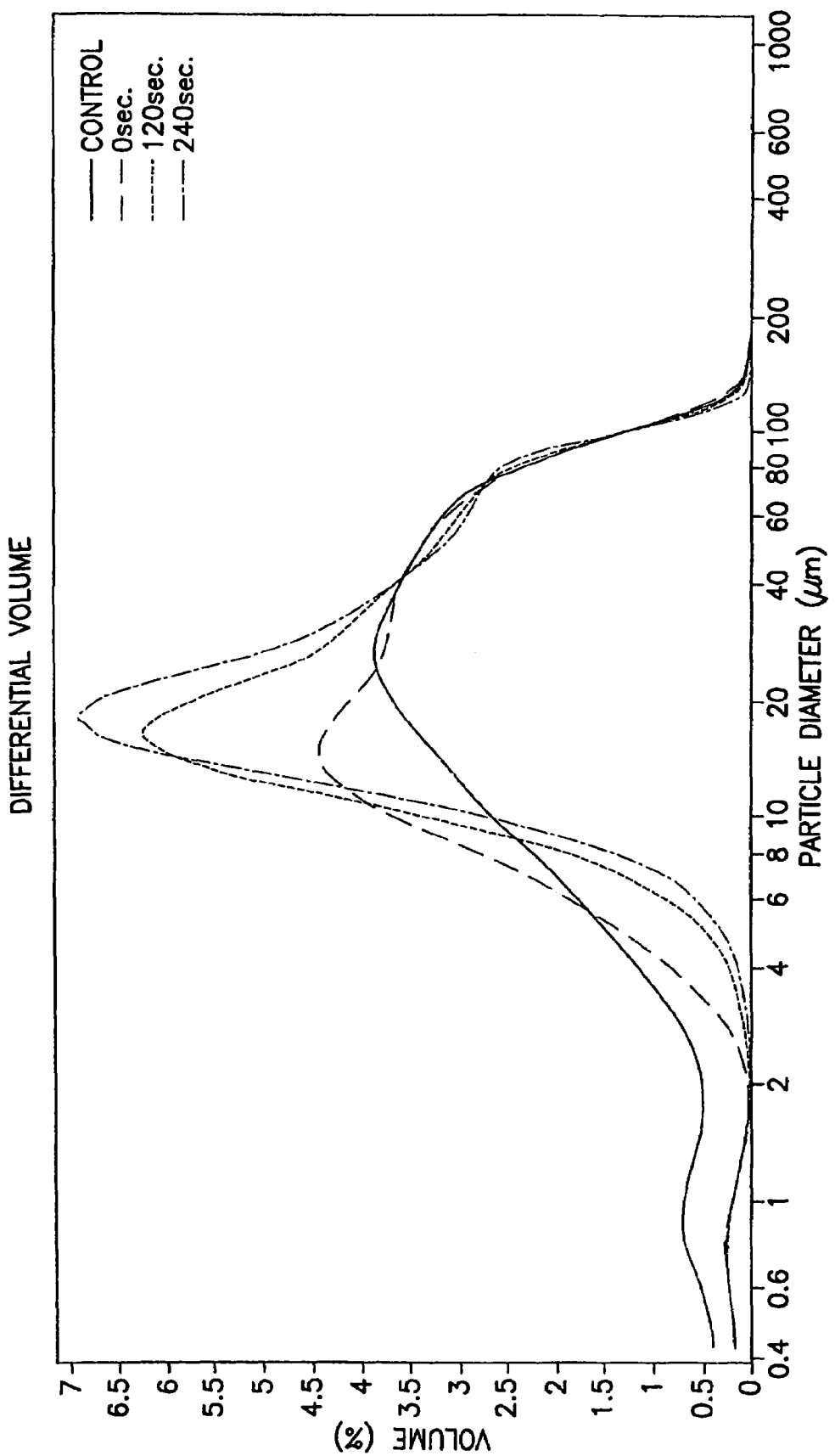
FIG. 7 is a volumetric size distribution of the polymeric binder of Example 4 treated for varying time periods.
Figure 8:
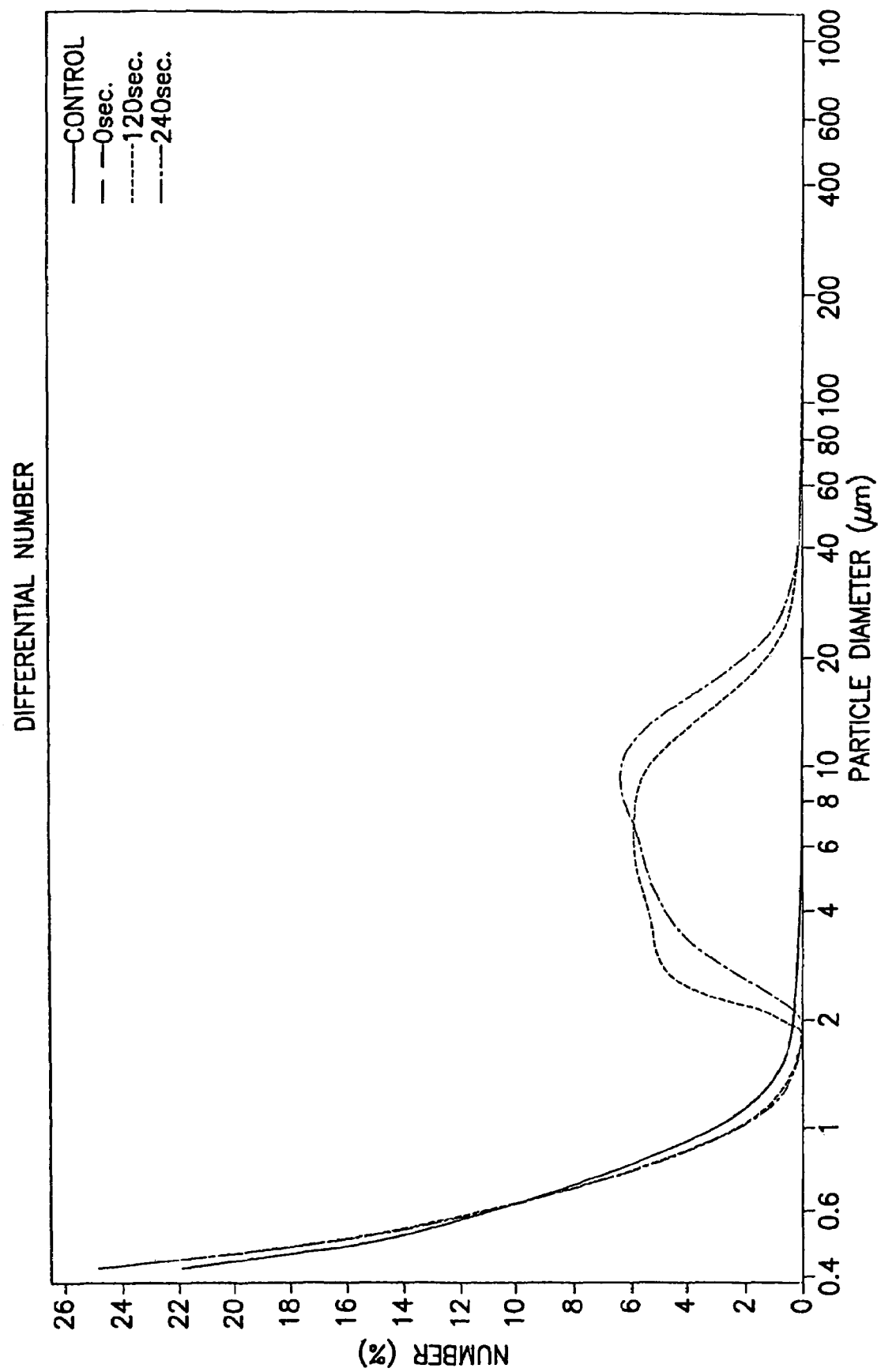
FIG. 8 is a populative particle size distribution of the polymeric binder of Example 4 treated at various time periods.

FIG. 7 is a volumetric particle size distribution of treatment of the acrylic urethane polymeric binder with 35% aluminum flake-like, color effect pigment. The bonding temperature was 156° F., and the particle size distributions were tested at the outset, 120 seconds and 240 seconds. The graphs for 120 and 240 records show complete removal of the fines according to the volumetric analysis. However, as shown in FIG. 8, which is a populative particle size distribution analysis, further fines were reduced at 240 seconds compared to 120 seconds. Accordingly, the recommended bonding condition for this system is 156° F. at 240 seconds.

EXAMPLE 5

Figure 9:
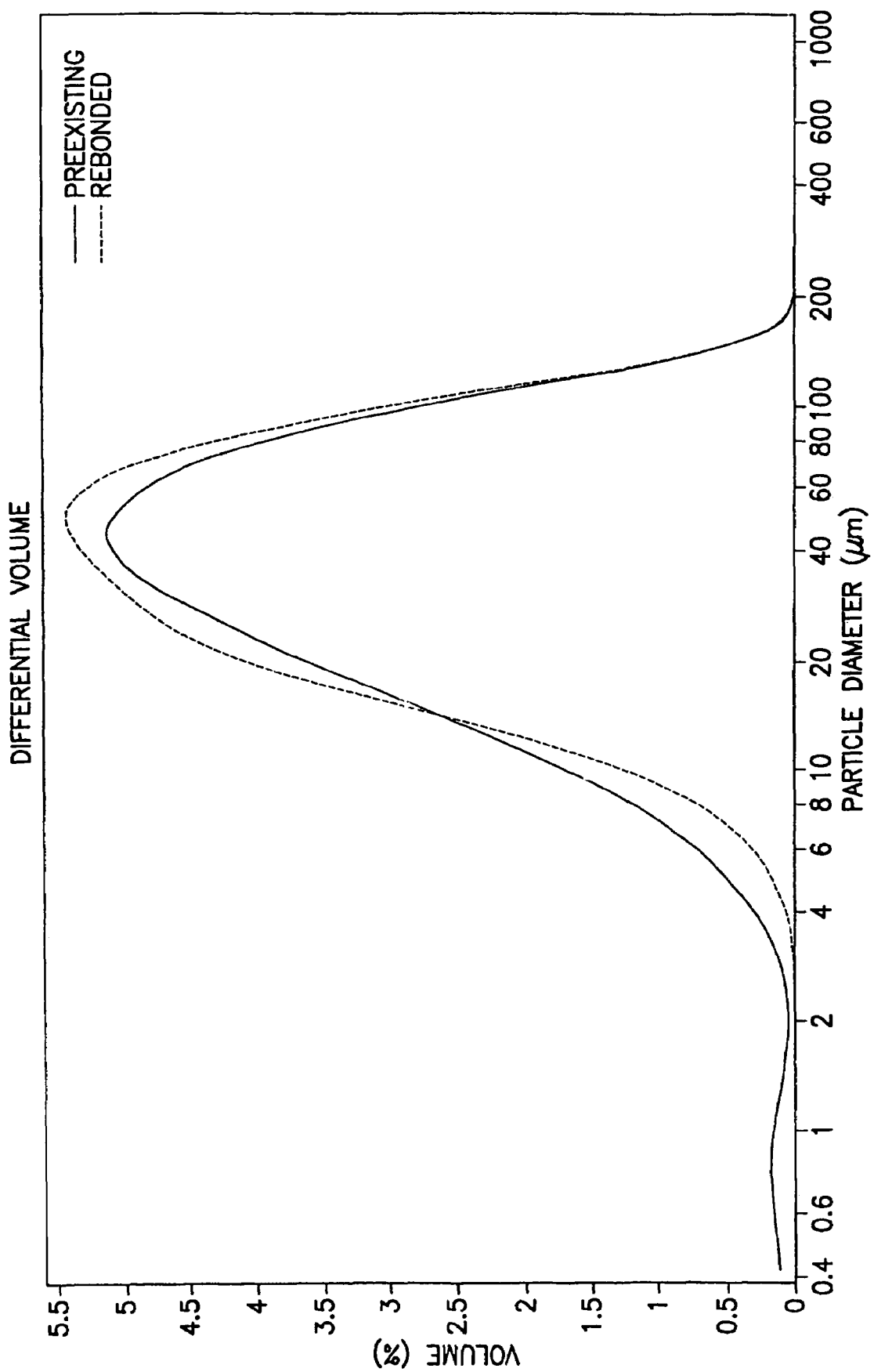
FIG. 9 is a graph of the volumetric size distribution of an industrial powder coated composition rebonded according to the method of the present invention.

A preexisting industrial powder coating composition containing a polyurethane produced from a hydroxy group containing-polyester and an isophorone diisocyanate was subjected to an additional heat treatment to rebond any remaining fines in that product. A populative particle size distribution analysis of the industrial powder coating prior to rebonding is shown in FIG. 9 as having a single mode. The industrial powder coating composition was heated in a Plasmec mechanical mixer as in Example 1. The onset $T_G$ was determined, and then the composition was heated to 2° F. increments above the onset $T_G$ until the fines were sufficiently removed. FIG. 9 shows that fines remaining in the preexisting industrial powder coating composition were removed after rebonding.

Figure 10:
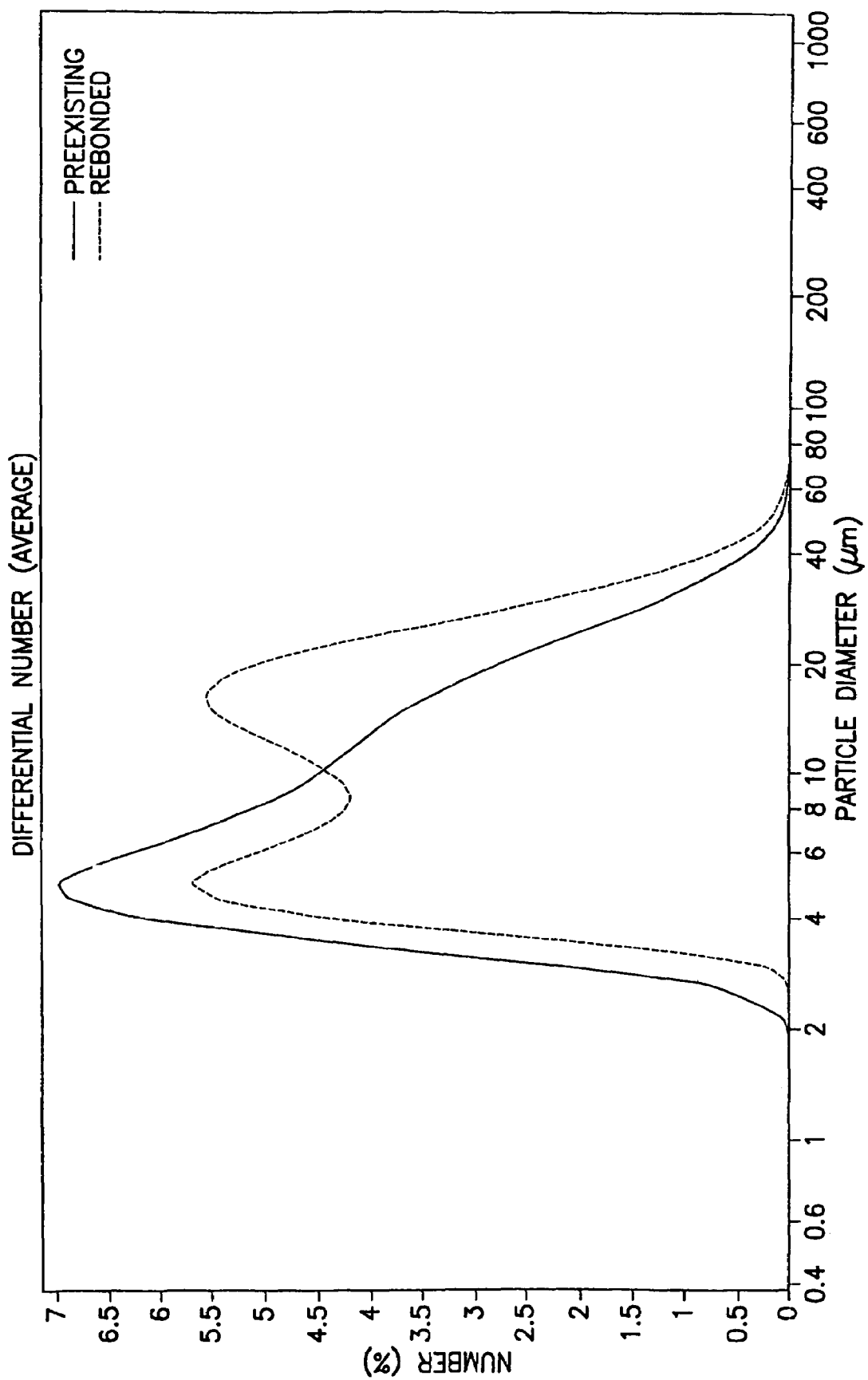
FIG. 10 is a graph of the volumetric size distribution of an automotive powder coating composition rebonded according to the method of the present invention.

This process was repeated with a conventional automotive powder coating composition containing the reaction product of a carboxylic acid group-containing polyester and a hydroxyalkylamide, bonded according to conventional practice to 2° F. above onset $T_G$. The conventional automotive powder coating composition was rebonded by heating to 120° F. As shown in FIG. 10, the single mode of the previously bonded automotive composition was shifted to a dual mode particle size distribution.

These examples of rebonding powder coating compositions that would conventionally be considered to have been completely processed indicates that the present invention can further remove fine particles and increase the coarser fractions of the powder coating compositions without causing any detrimental effect to the final product.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A process for manufacturing a powder coating composition comprising the steps of:
   (i) providing a base composition comprising non-leafing pigment particles and a polymeric binder;
   (ii) mixing the base composition at an elevated temperature;
   (iii) adding flake-like, color effect pigment particles into the base composition to produce a pigment composition, the pigment composition having an initial particle size distribution with fine particles;
   (iv) heating the pigment composition to a temperature to achieve a second particle size distribution substantially without fine particles, wherein said temperature is more than 2° F. greater than the $T_G$ of said pigment composition;
   (v) mixing the pigment composition produced in step (iv) at said temperature for a predetermined time period; and
   (vi) cooling the pigment composition from step (v) to produce the powder coating composition.

2. The process of claim 1, wherein the temperature is 1-15% greater than the $T_G$ of said pigment composition.

3. The process of claim 1, wherein particle size distribution is determined as a function of particle count, said initial particle size distribution having a single mode and said second particle size distribution being bimodal with a first mode showing a reduction in fine particles between 3 μm and 10 μm and a second mode showing an increase in particles between 10 μm and 40 μm when compared to the initial particle size distribution.

4. The process of claim 1, wherein said flake-like, color effect pigment particles comprise metal flakes.

5. The method of claim 1, wherein said temperature $\geqq 6°$ F. than the $T_G$ of said pigment composition.

6. A method of producing a powder coating composition comprising the steps of:
   (i) providing a pigment composition comprising flake-like, color effect pigment particles and a polymeric binder, said pigment composition having an initial particle size distribution with fine particles determined as a function of particle count in a single mode;
   (ii) mixing and heating the pigment composition to a temperature to achieve a second particle size distribution substantially with a reduction of fine particles when compared to the initial particle size distribution, the second particle size distribution determined as a function of particle count and being bimodal with a first mode showing a reduction in fine particles between 3 μm and 10 μm and a second mode showing an increase in particles between 10 μm and 40 μm when compared to the initial particle size distribution, and wherein said temperature is more than 2° F. greater than the $T_G$ of said pigment composition; and
   (iii) cooling the pigment composition from step (ii) to produce the powder coating composition.

7. The method of claim 6, wherein said temperature $\geqq 6°$ F. than the $T_G$ of said pigment composition.

8. A process for manufacturing a powder coating composition comprising the steps of:
   (i) providing a base composition comprising non-leafing pigment particles and a polymeric binder;
   (ii) mixing the base composition at an elevated temperature;
   (iii) adding flake-like, color effect pigment particles into the base composition to produce a pigment composition, the pigment composition having an initial particle size distribution with fine particles;
   (iv) heating the pigment composition to a temperature to achieve a second particle size distribution substantially with a reduction of fine particles when compared to the initial particle size distribution, the second particle size distribution determined as a function of particle count and being bimodal with a first mode showing a reduction in fine particles between 3 μm and 10 μm and a second mode showing an increase in particles between 10 μm and 40 μm when compared to the initial particle size distribution, and wherein said temperature is more than 2° F. greater than the $T_G$ of said pigment composition;
   v) mixing the pigment composition produced in step (iv) at said temperature for a predetermined time period; and
   (vi) cooling the pigment composition from step (v) to produce the powder coating composition.

9. A process for manufacturing a powder coating composition comprising the steps of:
   (I) providing a base composition comprising non-leafing pigment particles and a polymeric binder;
   (ii) mixing the base composition at an elevated temperature;
   (iii) adding flake-like, color effect pigment particles into the base composition to produce a pigment composition, the pigment composition having an initial particle size distribution with fine particles;

(iv) heating the pigment composition to a temperature to achieve a second particle size distribution substantially without fine particles;

(v) mixing the pigment composition produced in step (iv) at said temperature for a predetermined time period; and (vi) cooling the pigment composition from step (v) to produce the powder coating composition.

10. The process of claim 9, wherein said temperature is more than 2° F. greater than the $T_G$ of said pigment composition.

11. The process of claim 9, wherein the temperature is 1-15% greater than the $T_G$ of said pigment composition.

12. The process of claim 9, wherein said fine particles are sized up to 5 μm.

13. The process of claim 9, wherein particle size distribution is determined as a function of particle count, said initial particle size distribution having a single mode and said second particle size distribution having two modes.

14. The process of claim 13, wherein the mode of said initial particle size distribution is located between 5 μm and 20 μm and the two modes of said second particle size distribution are located between 10 μm and 50 μm.

15. The process of claim 9, wherein said flake-like, color effect pigment particles comprise metal flakes.

16. A powder coating composition comprising:
non-leafing pigment particles;
flake-like, color effect pigment particles; and
a polymeric binder, wherein the powder coating composition has a particle size distribution determined as a function of particle count having two count modes.

17. The powder coating composition of claim 16, wherein said two count modes are located between 10 μm and 50 μm.

18. The powder coating composition of claim 16, wherein said non-leafing pigment particles comprise organic coloring pigments or inorganic filler pigments or both.

19. An article comprising a substrate coated with the powder coating composition of claim 16.

20. The article of claim 19, wherein said substrate is metallic.

\* \* \* \* \*